United States Patent
Hölsö et al.

(10) Patent No.: US 6,210,617 B1
(45) Date of Patent: Apr. 3, 2001

(54) APPARATUS AND METHOD FOR ADJUSTING A MANDREL AND KERNEL WHILE PRODUCING A PLASTIC PIPE

(75) Inventors: Eino Hölsö, Svaneholm (SE); Jyri Järvenkylä, Hollola (FI)

(73) Assignee: Uponor Innovation AB, Fristad (SE)

(*) Notice: Subject to any disclaimer, the term of this patent is extended or adjusted under 35 U.S.C. 154(b) by 0 days.

(21) Appl. No.: 09/029,869

(22) PCT Filed: Sep. 10, 1996

(86) PCT No.: PCT/FI96/00479

§ 371 Date: Aug. 25, 1998

§ 102(e) Date: Aug. 25, 1998

(87) PCT Pub. No.: WO97/10092

PCT Pub. Date: Mar. 20, 1997

(30) Foreign Application Priority Data

Sep. 12, 1995 (FI) .................................................. 954273

(51) Int. Cl.[7] .................................................. B29C 47/90
(52) U.S. Cl. .................. 264/209.4; 264/167; 425/325; 425/381; 425/392; 425/396; 425/466; 425/467

(58) Field of Search ........................ 425/326.1, 381, 425/466, 467, 396, 392, 325; 264/508, 209.3, 209.4, 167

(56) References Cited

U.S. PATENT DOCUMENTS

| 4,936,768 | * | 6/1990 | Lupke | 425/532 |
| 5,139,730 | * | 8/1992 | Holso et al. | 264/508 |
| 5,286,183 | * | 2/1994 | Tonsi et al. | 425/113 |
| 5,346,384 |   | 9/1994 | Hegler et al. | 425/381 |
| 5,674,440 | * | 10/1997 | Klinedinst | 264/40.5 |

* cited by examiner

Primary Examiner—Jan H. Silbaugh
Assistant Examiner—Stefan Staicovici
(74) Attorney, Agent, or Firm—Ladas & Parry

(57) ABSTRACT

The present invention relates to an apparatus for producing pipes of a moldable material, preferably plastic, comprising an extruder, a cylindrical mold comprising chill molds (4, 5), a mandrel (8) inside the extruder and a kernel (9) as an extension of the mandrel. The mandrel is attached at its front end to the extruder. The mandrel (8) and the kernel (9) can be kept concentric with the extruder and the mold if the mandrel and the kernel are joined to each other in such a manner that the angle between their center lines is adjustable.

15 Claims, 4 Drawing Sheets

Figure 1:
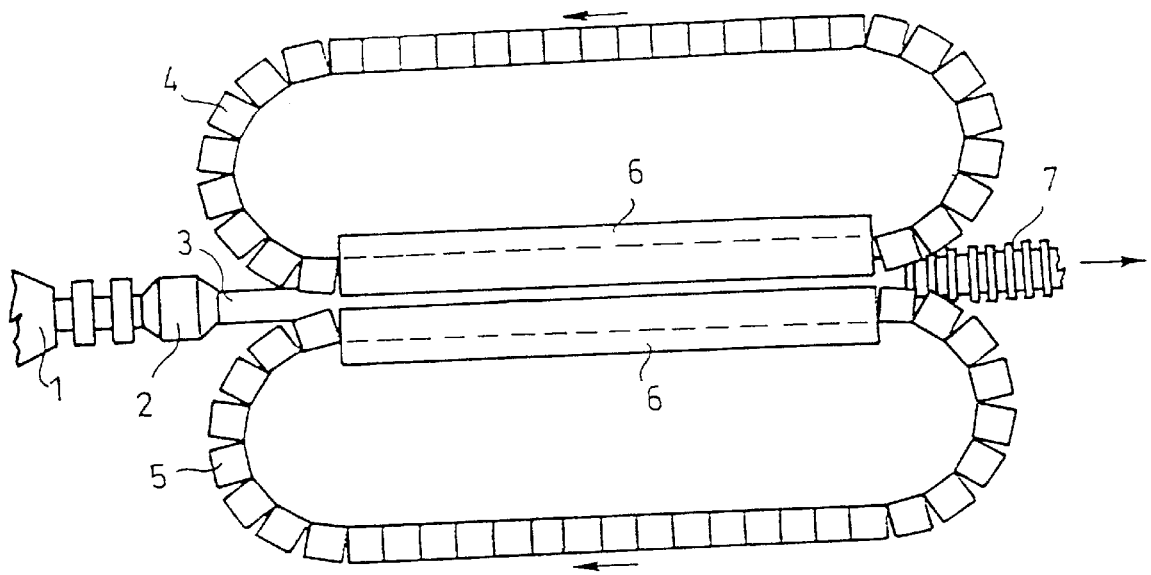

APPARATUS AND METHOD FOR ADJUSTING A MANDREL AND KERNEL WHILE PRODUCING A PLASTIC PIPE

The present invention relates to an apparatus for producing pipes of a mouldable material, preferably plastic, comprising an extruder for extruding molten plastic from at least one annular nozzle, a substantially cylindrical mould as an extension of the extruder for shaping the outer surface of the plastic pipe, a longitudinal mandrel substantially inside the extruder, and a kernel outside the nozzle as an extension of the mandrel. The present invention also relates to a method for producing plastic pipes.

An apparatus of this kind is known from U.S. Pat. No. 4,846,660, for example. As the production speed of manufacturing apparatuses for plastic pipe increases, the kernel situated in the centre line of the apparatus should be made ever longer so that the plastic pipe could cool sufficiently before the calibrating effect of the kernel to the inner surface of the pipe ceases. The mandrel and the kernel joined thereto can be attached to other parts of the apparatus, most often to an extruder, only at the front end of the mandrel in which the attachment elements will not stop the flow of plastic. A disadvantage of this known attachment method is that the mandrel and the kernel are not coaxial with the centre line of the extruder and the mould, but are situated, the kernel in particular, below the centre line. As a result of the eccentric position of the mandrel and the kernel, the wall thickness of the plastic pipe produced in the apparatus varies in the direction of the circle which is detrimental to the durability of the pipe. The eccentricity of the wall of the pipe causes particularly many problems when pipes are produced of materials whose shrinkage is dependent on crystallinity degree. For example, polyethylene pipes will bend easily into a banana shape just because of this problem.

WO 91/06417 discloses an apparatus for manufacturing plastic pipe in which the mandrel is attached flexibly into an extruder so that the mandrel and thus also the kernel can be adjusted in the transverse direction in order to achieve coaxiality. In order to bring about flexibility, the mandrel is attached to the extruder by means of calotte-like surfaces adjustable with respect to one another.

A disadvantage of the prior art apparatus shown above is that it is almost impossible to render the unit formed by the mandrel and the kernel coaxial with the centre line of the extruder and the mould. It has been shown in practice that it is virtually impossible to get both the mandrel and the kernel into a coaxial position as their longitudinal axles are quite often at an angle with respect to one another. Therefore, if the mandrel is adjusted at its point of attachment in such a manner that it is situated coaxially inside the extruder, the kernel usually settles into a position where its tail end is lower down than the front end joined to the mandrel. It is not shown in said WO reference how the adjustment of the point of attachment of the mandrel is carried out in practice, but in prior art apparatuses with this possibility for adjusting, the apparatus has to be halted during adjustment.

The object of the present invention is to provide an apparatus for producing plastic pipes where both mandrel and kernel can be put into a coaxial position with respect to the extruder and the mould. The apparatus according to the invention is characterized in that the mandrel and the kernel are joined together in such a manner that the angle between their centre lines is adjustable at the junction.

The invention is based on the fact that the plastic pipe blank is considerably softer at the front end of the kernel than at its tail end when the apparatus is in use. When the angle between the mandrel and the kernel is altered, the kernel which is supported at its tail end to the rigid pipe blank rotates around a point of the edge of the tail end, whereby the front end of the kernel moves in the mould in the transverse direction of the mould and transports the tail end of the mandrel with it. The invention is particularly useful in apparatuses in which the combined length of the mandrel and the kernel has to be especially great because of the raw material of the pipe, for example. If means for effecting a relative movement for the joint surfaces are placed between the mandrel and the kernel, the adjusting process can be carried out during the operation of the apparatus.

One preferred embodiment of the invention is characterized in that the end surface of a conically expanding portion of the mandrel comprises at the centre line of the mandrel a protruding pin which is surrounded by the joint surface of the mandrel, and that the joint surface of the kernel is situated in an annular end piece that surrounds the pin. This structure makes the mutual adjustment of the mandrel and the kernel possible in a simple manner. In order that plastic substance would not enter between the mandrel and the kernel, it is preferable that the pin of the mandrel comprises means for pressing the joint surfaces of the mandrel and the kernel against each another. These means can be formed of a nut threaded to the pin or a spring surrounding the pin.

According to one very preferred embodiment of the invention, there is between the mandrel and the kernel an adjusting piece that changes its shape and/or size with the effect of temperature by means of which piece a relative movement of the joint surfaces of the mandrel and the kernel can be effected. By means of this adjusting piece, the angle position between the mandrel and the kernel can be changed in a simple manner by altering the temperature of the adjusting piece by means of electric current, for example. The adjusting piece provides especially the advantage that the apparatus need not be halted during adjusting. The adjusting piece may be situated between the mandrel pin mentioned above and the end piece of the kernel, for example.

The present invention further relates to a method for producing pipes of a mouldable material, preferably plastic, by means of an apparatus comprising an extruder for extruding molten plastic from at least one annular nozzle, a substantially cylindrical mould as an extension of the plastic pipe for shaping the outer surface of the plastic pipe, a longitudinal mandrel substantially inside the extruder, and a kernel outside the nozzle connected to the mandrel.

The method according to the invention is characterized in that in order to adjust the position of the mandrel with respect to the mould perpendicularly against the centre line of the mould, the angle between the centre lines of the kernel and the mandrel is adjusted until the front end of the kernel, which is supported at its tail end to the already cooled pipe blank, has transferred the tail end of the mandrel into a desired position.

Figure 3:
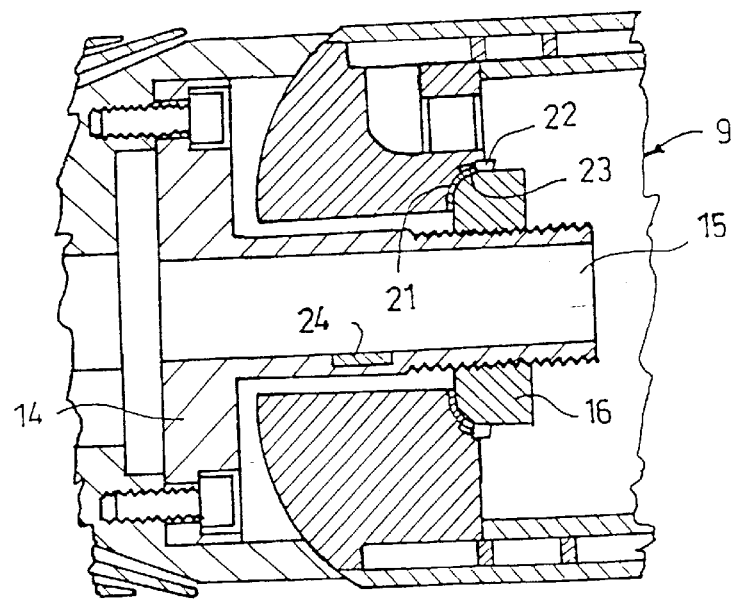
Figure 2:
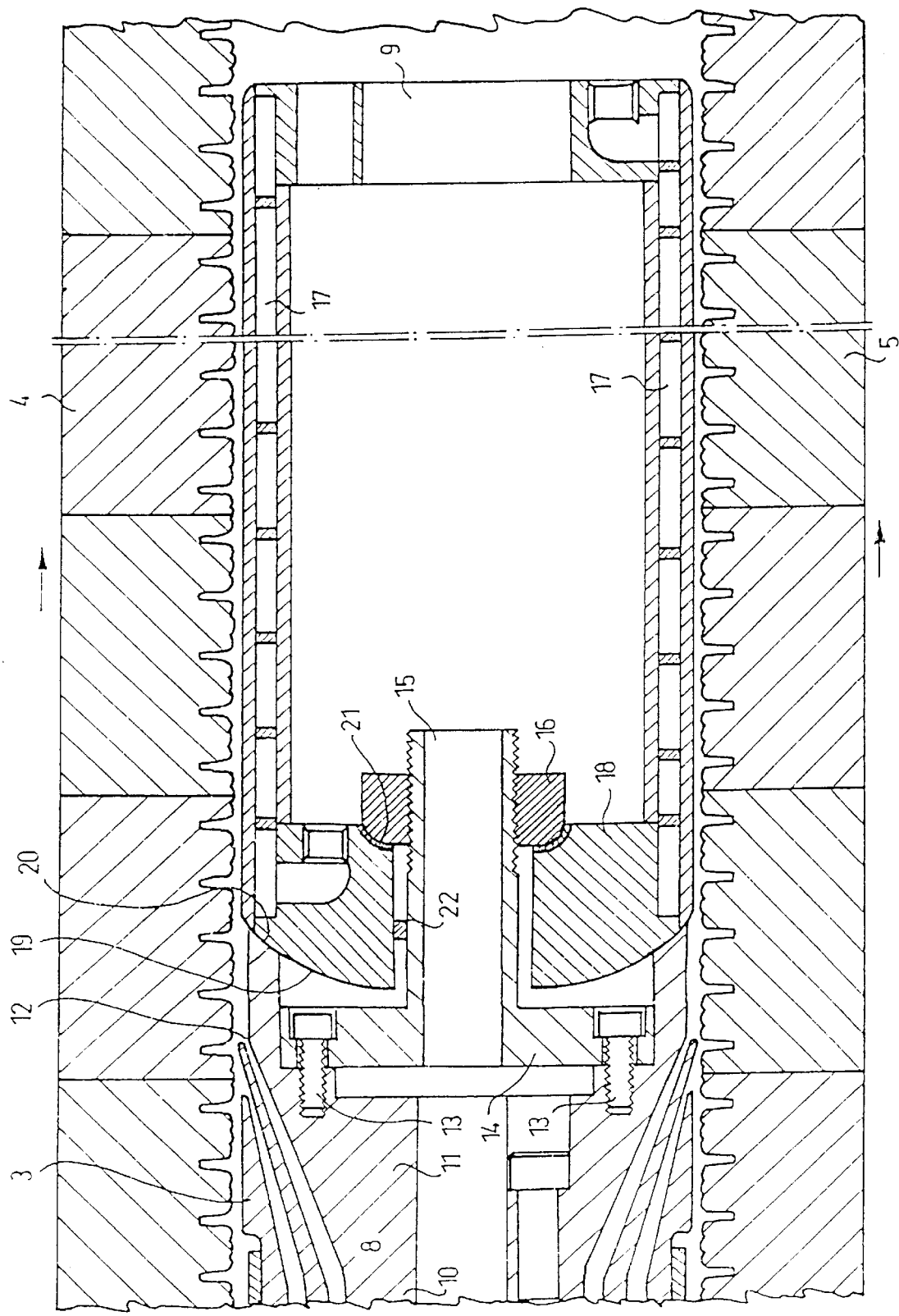
Figure 4:
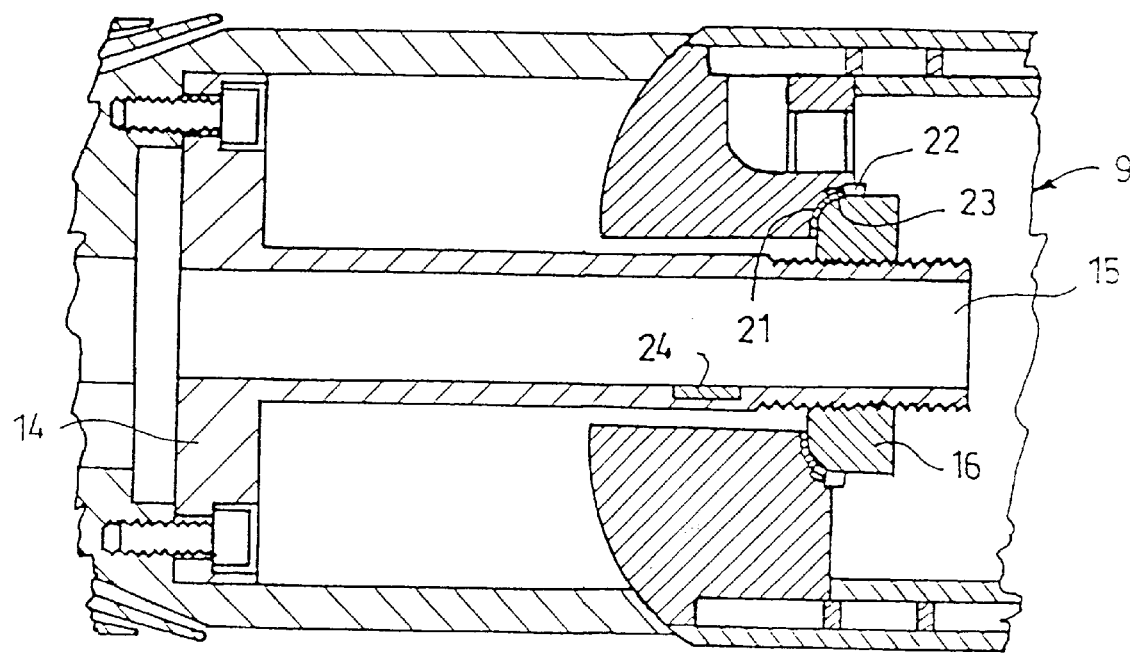
Figure 5:
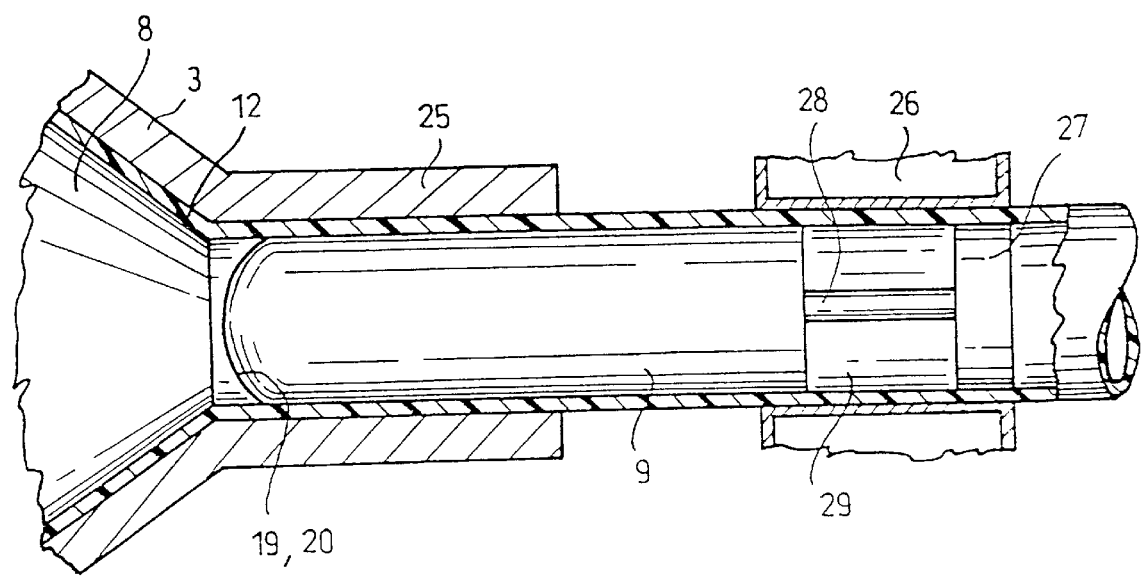

In the following, the invention will be explained in more detail with reference to the drawing, wherein FIG. 1 shows a schematic side-view of the apparatus according to the invention, FIG. 2 shows a longitudinal sectional view of a detail of the apparatus, FIG. 3 shows a longitudinal sectional view of a second embodiment of the apparatus, FIG. 4 shows a longitudinal sectional view of a third embodiment of the apparatus, and FIG. 5 shows a partial longitudinal sectional view of a fourth embodiment of the apparatus.

The production apparatus for pipes of a mouldable material, especially plastic, according to FIG. 1 comprises an extruder 1, a main head 2 connected to it and an extruder shell 3. The apparatus also comprises a cylindrical mould that is produced of two endless rows of chill moulds 4 and 5 that meet each other at the extruder shell 3 for forming a mould. The chill moulds travel along guide rails 6 at the mould. The figure also shows a finished plastic pipe 7 produced by the apparatus.

In the centre line of the mould produced by the extruder and the chill moulds 4, 5 there is a mandrel 8 forming the inner space of the plastic pipe and a kernel 9 as its extension when viewed in the production direction of the apparatus. The mandrel comprises two parts, a cylindrical front end portion 10 and a conically expanding tail portion 11 to the end of which the kernel is joined. The extruder shell 3 ends substantially at the end of the expanding portion of the mandrel where the nozzle 12 of the extruder is situated. The apparatus shown has two concentric nozzles. The mandrel 8 is connected at its front end to the extruder or adjustably to the body of the apparatus as shown in WO-91/06417, for example, or alternatively, fixedly.

In the embodiment according to FIG. 2, a disc 14 is attached to the tail end of the expanding portion 11 of the mandrel, a hollow pin 15 projecting from the mandrel being at the centre of the disc. At the end of the pin there are external threads onto which a nut 16 is threaded.

The kernel 9 is substantially cylindrical, that is, it has a constant diameter and it has means, such as channels 17 for a cooling agent. The kernel, differing from the mandrel, is thus cooled down and its front end is situated substantially at the nozzle 12, most suitably some distance after the nozzle. At the front end of the nozzle there is an annular end piece 18 which envelops the pin 15 and whose joint surface 19 towards the mandrel is curved at its cross section. The curved surface 19 of the end piece presses to a joint surface 20 of a corresponding shape at the tail end of the expanding portion 11 of the mandrel. The joint surfaces 19, 20 are each parts of a ball-shaped surface, the surfaces being convex when viewed in the production direction of the apparatus.

The end piece 18 of the kernel rests against the nut 16 by means of a curved ring surface 21 for pressing the joint surfaces 19, 20 against one another. An adjusting piece 22 is between the pin 15 and the end piece 18, the adjusting piece being an agent that changes its shape and/or size with temperature. The adjusting piece is connected via a line (not shown) to a power supply.

The apparatus according to the invention operates in the following way. If the centre line of the mandrel 8 settles because of gravity, for example, to an angle with respect to the centre line of the extruder and the mould in such a manner that when viewed in the production direction of the apparatus, the centre of the tail end of the mandrel is below the centre line of the mould, the temperature of the adjusting piece 22 is affected electrically in such a manner that it increases the distance between the pin 15 and the end piece 18, whereby the kernel rotates on sliding surfaces 21 and along joint surfaces 19, 20 around the rotation point in the central axis of the mandrel 8 and thus also of the pin 15. As the pipe blank is relatively rigid at the tail end of the kernel, the distance between the tail end of the kernel and the chill moulds 5 will not diminish, but the kernel rotates around its tail end, whereby the upper edge of its front end comes closer to the chill moulds 4. The upward directed movement of the front end of the kernel moves the tail end of the mandrel upwards, whereby the wall thickness of the pipe blank diminishes above the mandrel, when the centre of the mandrel approaches the centre line of the mould. The angle between the mandrel and the kernel is after this adjusted in such a manner that the kernel will be parallel with the centre line of the mandrel.

If, on the other hand, we assume that the apparatus produces a pipe whose wall is thinner in the upper portion of FIG. 2 than in the lower portion, the size of the adjusting piece 22 is diminished in the vertical direction of the figure. As a result of this operation, the tail end of the kernel tends to move upwards. As the tail end is supported to plastic that is already hardened, the tail end of the kernel cannot, however, move upwards, whereby the end piece 18 of the kernel is forced to move downwards and bend the mandrel 8 downwards with it. In that case, the width of the nozzle 12 increases in the upper portion, as a result of which the thickness of the wall of the pipe increases in the upper portion in FIG. 2.

FIG. 3 shows an embodiment where the end piece 18 is pressed against the surface 20 by means of spring force that has been effected by a disc spring 23 placed between the end piece and the nut 16. FIG. 3 also shows an alternative position of the adjusting piece 22 between the end piece 18 and the nut 16. There may be three adjusting pieces, for example and the angle distance between them is about 120°.

There is also an alterative included in FIG. 3 in which there are a plurality of electric resistors in the pin 15 in the place of the adjusting pieces 22 or in addition to them. If there are three electric resistors, their angle distance is most suitably 120°. By adjusting the temperature of one resistor, the pin can be bent in a desired direction as a result of heat expansion of the pin material, whereby the angle between the mandrel and the kernel will also change. If desired, the kernel can in this case be fixedly mounted on the pin 15.

FIG. 4 shows an embodiment where the kernel is at a distance from the nozzle 12.

Differing from the above, the joint between the mandrel and the kernel can be realized in other ways. Therefore, the joint surfaces 19, 20 can be pressed against one another by placing a helical spring surrounding the pin 15 between the nut 16 and the kernel. The adjusting pieces 22 and the resistors 24 can be replaced by different mechanic, hydraulic or pneumatic means, such as screws and cylinders. For example, springs can be arranged between the tail end of the expanding portion of the mandrel and the disc 14, which springs surround the retaining screws 13, and the screws 13 can be made to be adjustable in length by means of electricity, for example, whereby it is possible to adjust the angle position of the pin 15 and thus the kernel with respect to the mandrel. Shortening of the adjusting elements to be heated can be advanced by means of a circulating cooling liquid. In the disclosed embodiment the pin 15 is rigid, but when required, it can be replaced by a flexible pin that allows the angle of the kernel to be adjusted.

FIG. 5 shows an embodiment where the kernel 9 extends to a calibrator 26 placed after a mould 25, the calibrator having a smooth, cylindrical surface which finishes the outer surface of the pipe and which is normally cooled. The advantages of the present invention are especially apparent in this apparatus where the kernel is long and extends to the calibrator, and where the pipe material is completely hardened and thus forms a good supporting point for the rotational movement of the kernel.

At the tail end of the kernel according to FIG. 5 there is at the calibrator a plug 27 that is connected to the front portion of the kernel with a connecting pipe 28 whose diameter is smaller than the diameter of the front portion of the kernel and the plug 27 in such a manner that an annular space 29 is formed between the connecting pipe and the inner surface of the plastic pipe, which space can be filled with cooling water, for instance. The connecting pipe 28 can alternatively be formed to be such that its diameter will grow towards the front portion of the kernel and the plug 27 in order to avoid abrupt joints. The plug can also be replaced by wheels. The connecting pipe 28 can be provided with an external thread which extends to the inner surface of the plastic pipe and in which cooling water circulates.

The chill moulds 4, 5 according to FIG. 2 are provided with grooves forming rib flanges on their inner surfaces. Alternatively, the inner surface of the chill moulds can be smooth or the moving chill moulds can be replaced by a smooth stationary cylindrical mould surface. The cooling of the pipe in the area of the kernel 9 can be realized as mentioned above by means of a cooled kernel or alternatively, by means of cooled chill moulds 4, 5 or a cooled mould surface, or by means of both the kernel and the chill moulds. The diameter of the substantially cylindrical kernel can diminish towards the tail end of the kernel in order to prevent the pipe from sticking to the kernel. The means 13, 22, 24 between the mandrel and the kernel can be, when required, replaced by other means for achieving the angle change, for example with an adjusting rod extending through the mandrel to the kernel. The angle change can alternatively be achieved manually if the machine is halted for the duration of adjusting.

What is claimed is:

1. An apparatus for producing pipes of a mouldable material, comprising:
    an extruder (1) for extruding mouldable material from at least one annular nozzle (12);
    a substantially cylindrical mould (4,5,25) as an extension of the extruder (1) for shaping the outer surface of the mouldable material;
    a longitudinal mandrel (8) substantially inside the extruder (1); and
    a kernel (9) outside the nozzle as an extension of the mandrel,
    wherein the mandrel (8) and the kernel (9) are joined together at a junction in such a manner that the angle between their centre lines is adjustable at the junction (15,16,18–21),
    wherein the junction (15, 16, 18–21) between the mandrel (8) and the kernel (9) is situated essentially at the nozzle (12) of the extruder (1),
    wherein the mandrel (8) and the kernel (9) comprise joint surfaces (19, 20) essentially opposite one another,
    wherein there are means (13, 22, 24) between the mandrel (8) and the kernel (9) for effecting a relative movement of the joint surfaces, and
    wherein an end surface of a conically expanding portion (11) of the mandrel has a pin (15) protruding at the centre line of the mandrel, the end surface of the mandrel being the joint surface (20) of the mandrel, and that the joint surface (19) of the kernel is situated in an annular end piece (18) that surrounds the pin (15).

2. An apparatus according to claim 1, characterized in that the pin (15) comprises in the vicinity of the circle of the pin elements situated at a distance from one another for bending the pin by means of heat expansion.

3. An apparatus according to claim 1, characterized in that the pin (15) is attached to the mandrel (8) with retaining elements which are situated in a circle surrounding the centre line of the mandrel and which can be selectively heated and/or cooled for changing the angle position between the pin and the mandrel.

4. An apparatus according to claim 1, characterized in that the pin (15) of the mandrel comprises means (16) for pressing the joint surfaces (20,19) of the mandrel and the kernel against each another.

5. An apparatus according to claim 4, characterized in that a pressing means is a nut.

6. An apparatus according to claim 5, characterized in that there is a spring element between the end piece (18) and a nut (16) as the pressing means for pressing the end piece against the joint surface (20) of the mandrel.

7. An apparatus according to claim 1, characterized in that the means (22) for effecting a relative movement of the joint surfaces are situated between the pin (15) and the end piece (18) in order to effect a transverse movement in the kernel with respect to the middle axis of the mandrel.

8. An apparatus according to claim 1, characterized in that there is between the mandrel (8) and the kernel (9) an adjusting piece (13,22,24) which changes its shape and/or size with the effect of temperature, and by means of which a relative movement between the joint surfaces (20,19) of the mandrel and the kernel can be effected.

9. An apparatus according to claim 8, characterized in that the adjusting piece (13,22,24) can be connected to a power supply.

10. An apparatus according to claim 1, characterized in that the joint surfaces (19,20) are ball-shaped surfaces.

11. A method for producing pipes of a mouldable plastic, comprising:
    extruding molten plastic from at least one annular nozzle (12) of an extruder (1) having a kernel (9) outside the nozzle (12) with a front end adjustably connected to a tail end of a longitudinal mandrel (8) having an opposite, supported front-end portion in the extruder (1);
    shaping an outer surface of the plastic in a substantially cylindrical mould (4,5,25) as an extension of the extruder (1); and
    adjusting with the adjustable connection an angle between centre lines of the kernel and the mandrel,
    whereby the front end of the kernel (9), which is supported at its opposite tail end (27) on the plastic which is already cooled, transfers the tail end of the mandrel (8) into a desired position.

12. In a system for moulding a material that is solid after the molding by extruding the material about a mandrel into a mould that carries away the material for the moulding, the mandrel having a supported front-end portion in an extruder and an opposite tail end with a connection to a front end of a kernel that extends through the mould to a tail end at a point after the moulding where the material is solid, the improvement wherein the connection comprises:
    joining means joining the tail end of the mandrel to the front end of the kernel for adjusting an angle between centre lines respectively between the front-end portion and tail end of the mandrel and front and tail ends of the kernel during the moulding,
    wherein the joining means (15, 16, 18–21) between the mandrel (8) and the kernel (9) is situated essentially at the nozzle (12) of the extruder (1) and
    wherein the joining means are inside at least one of the mandrel and kernel and thermally responsive for adjusting the angle between the center lines.

13. The system according to claim 12, wherein the tail end of the mandrel and front end of the kernel comprise complementarily curved joint surfaces essentially at one another for making the mandrel and kernel substantially continuous longitudinally of the centre lines across the joint surfaces.

14. The system according to claim 12, wherein the joining means provides for adjusting the angle between the center lines as a function of the material that is solid.

15. The system according to claim 13, wherein the joining means provides for adjusting the angle between the center lines as a function of the material that is solid.

* * * * *